United States Patent Office 2,805,257
Patented Sept. 3, 1957

2,805,257
1-ETHYNYL-CYCLOHEXYLTHIOLS

Fred J. Lowes and Roger F. Monroe, Midland, Mich., assignors to The Dow Chemical Company, Midland, Mich., a corporation of Delaware No Drawing. Application August 2, 1956, Serial No. 601,655

4 Claims. (Cl. 260—609)

This invention relates to the 1-ethynyl-cyclohexylthiols having the formula

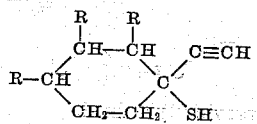

In this and succeeding formulas, one of the R symbols represents methyl or hydrogen and the remaining R symbols represent hydrogen. These compounds are colorless liquids, somewhat soluble in many organic solvents and of very low solubility in water. They have been found to be active as plant growth control materials and are adapted to be employed as active toxic constituents in dust and spray compositions for the control of the growth of weeds and for the sterilization of soil with regard to plant growth. The compounds are also useful as corrosion inhibitors in acid solutions.

The new compounds may be prepared by the reaction of an alkali metal sulfhydrate with a 1-ethynyl-cyclohexyl chloride having the formula

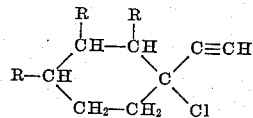

The reaction is carried out in the presence of a solvent such as ethanol. Good results are obtained when employing equimolecular proportions of the reactants. The reaction takes place smoothly at temperatures of from 0° to 50° C. with the formation of the desired product and alkali metal chloride of reaction. The reaction is exothermic and the temperature may be controlled by regulating the rate of contacting the reactants and by external cooling. Upon completion of the reaction, the crude reaction mixture is washed with water and thereafter fractionally distilled under reduced pressure to separate the desired product.

In carrying out the reaction, the 1-ethynyl-cyclohexyl chloride may be added portionwise with stirring to the alkali metal sulfhydrate (preferably sodium) dissolved in ethanol. The addition is carried out over a period of about four hours and at a temperature of from 0° to 50° C. In an alternative procedure, the reactants and solvent are placed in a closed reactor and maintained with stirring for a period of time in the contacting temperature range. The reaction mixture is then washed with water and fractionally distilled to obtain the desired product as a colorless liquid.

The following examples illustrate the invention but are not to be construed as limiting:

EXAMPLE 1

*1-ethynyl-cyclohexylthiol*

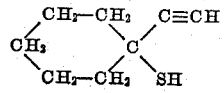

142.5 grams of 1-ethynyl-cyclohexyl chloride and 60 grams of sodium sulfhydrate in 150 milliliters of ethanol were mixed together with stirring and cooling and maintained for two hours at 20° C. After this period, the reaction mixture was washed with water and thereafter fractionally distilled under reduced pressure to separate a 1-ethynyl-cyclohexylthiol product as a colorless liquid boiling at 45° C. at 6.5 millimeters pressure and having a density of 0.995 at 25° C.

EXAMPLE 2

*1-ethynyl-2-methylcyclohexylthiol*

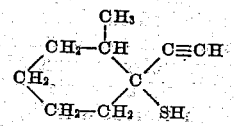

One mole of 1-ethynyl-2-methylcyclohexyl chloride boiling at 49° C. at 1.5 millimeters pressure and one mole of sodium sulfhydrate are dissolved in 200 milliliters of ethanol and the resulting mixture maintained at 25° C. for eight hours with continuous agitation. Following this period, the reaction mixture is washed with water and fractionally distilled under reduced pressure to separate a 1-ethynyl-2-methylcyclohexylthiol product as a colorless liquid having a molecular weight of 155.

EXAMPLE 3

156.5 grams of a mixture containing 1-ethynyl-2-methyl-cyclohexyl chloride, 1-ethynyl-3-methyl-cyclohexyl chloride and 1-ethynyl-4-methyl-cyclohexyl chloride boiling at 40° C. at 1 millimeter pressure was mixed with 66 grams of sodium sulfhydrate and 150 milliliters of ethanol. The resulting mixture was agitated for about eight hours at room temperature and thereafter washed thoroughly with water. The washed mixture was then fractionally distilled under reduced pressure to separate a product containing 1-ethynyl-2-methyl-cyclohexylthiol, 1-ethynyl-3-methyl-cyclohexylthiol and 1-ethynyl-4-methylcyclohexylthiol. This product was a colorless liquid which boiled at 65°–68° C. at 11 millimeters pressure.

EXAMPLE 4

One mole of 1-ethynyl-4-methyl-cyclohexyl chloride is added portionwise with stirring to one mole of sodium sulfhydrate dissolved in 150 milliliters of ethanol. The addition is carried out over a period of four hours and at a temperature of 20° C. Following the addition, the reaction mixture is washed with water and thereafter fractionally distilled under reduced pressure to separate a 1-ethynyl-4-methyl-cyclohexylthiol product having a molecular weight of 155. In an exactly similar manner 1-ethynyl-3-methyl-cyclohexyl chloride is reacted with sodium sulfhydrate in ethanol to produce a 1-ethynyl-3-methyl-cyclohexylthiol.

The new 1-ethynyl-cyclohexylthiols of the present invention are effective as herbicides for the killing of weeds and the sterilization of soil with regard to plant growth. For such use the products may be dispersed on an inert finely divided solid and employed as dusts. Such mixtures may also be dispersed in water with or without a wetting agent and the resulting aqueous suspensions employed as sprays. In other procedures, the products may be employed as active toxic constituents of oil-in-water emulsions or aqueous dispersions with or without the addition of wetting, dispersing or emulsifying agents. In representative operations, good controls of the growth of the seeds and emerging seedlings of radish, sorghum and cotton are obtained with 1-ethynyl-cyclohexylthiol when applied at the rate of 20 pounds per acre to soil previously planted with seeds of said species.

The 1-ethynyl-cyclohexyl chlorides employed as starting materials as herein described may be prepared by reacting 1-ethynyl-cyclohexanol or a 1-ethynyl-methyl-cyclohexanol with an excess of hydrochloric acid in the presence of copper sulfate as a catalyst. In carrying out the reaction, the cyclohexanol is added gradually portion-wise to a mixture of concentrated hydrochloric acid and catalyst at a temperature of from about 10° to 25° C. Following the reaction, the reaction mixture is washed with water and fractionally distilled under reduced pressure to separate the desired product as a colorless liquid.

The 1-ethynyl-cyclohexanol and 1-ethynyl-methylcyclohexanols employed as starting materials may be prepared by reacting cyclohexanone or a methyl-cyclohexanone with sodium acetylide to produce a sodium salt of 1-ethynyl-cyclohexanol or a 1-ethynyl-methyl-cyclohexanol. The salt compound is then hydrolyzed with sulfuric acid to obtain the desired starting material. In the first phase of the reaction, the cyclohexanone is reacted portionwise with an equimolar amount of sodium acetylide in the presence of liquid ammonia and at or below the temperature at which ammonia is liquid at atmospheric pressure. Following the initial phase of the reaction, the reaction mixture is made slightly acid with sulfuric acid and thereafter fractionally distilled under reduced pressure to separate the desired starting material.

We claim:
1. A compound having the formula

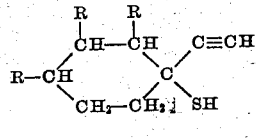

wherein one of the R symbols represents a member of the group consisting of methyl and hydrogen and the remaining R symbols represent hydrogen.

2. 1-ethynyl-cyclohexylthiol.

3. A process for the manufacture of a compound having the formula

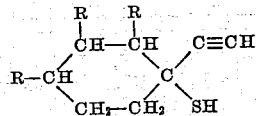

wherein one of the R symbols represents a member of the group consisting of methyl and hydrogen and the remaining R symbols represent hydrogen which comprises reacting an alkali metal sulfhydrate with a compound having the formula

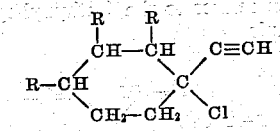

wherein R is as previously defined.

4. A process claimed in claim 3 wherein substantially equimolecular proportions of the reactants are employed.

No references cited.